United States Patent [19]

Levin

[11] 3,716,713

[45] Feb. 13, 1973

[54] INPUT SCREEN FOR IMAGE DEVICES HAVING REDUCED SENSITIVITY IN THE CENTAL REGION

[75] Inventor: Nathan D. Levin, Los Altos Hills, Calif.

[73] Assignee: Varian Associates, Palo Alto, Calif.

[22] Filed: Jan. 9, 1969

[21] Appl. No.: 790,144

[52] U.S. Cl. ..............250/80, 250/213 VT, 313/65 R

[51] Int. Cl. ..............H01j 1/62

[58] Field of Search .........250/71.5, 80, 83.3 IR, 213; 313/65

[56] References Cited

UNITED STATES PATENTS

| | | | |
|---|---|---|---|
| 2,820,146 | 1/1958 | Kunes | 250/80 |
| 3,163,765 | 12/1964 | Niklas | 250/71.5 X |
| 3,303,374 | 2/1967 | Fyler | 250/80 |

*Primary Examiner*—James W. Lawrence

*Assistant Examiner*—Davis L. Willis

*Attorney*—Stanley Z. Cole

[57] ABSTRACT

Image device input screen having greater image conversion efficiency in the peripheral region of the screen than in the central region. Preferred embodiments include, separately or in combination, a screen scintillator having the shape of a diverging meniscus, a semi-transparent screen filter layer having the shape of a converging meniscus, and variations in regional compositions of a screen photocathode.

3 Claims, 9 Drawing Figures

INVENTOR.
NATHAN D. LEVIN
BY
ATTORNEY

INVENTOR.
NATHAN D. LEVIN
BY
[signature]
ATTORNEY

INPUT SCREEN FOR IMAGE DEVICES HAVING REDUCED SENSITIVITY IN THE CENTAL REGION

BACKGROUND OF THE INVENTION

This invention relates generally to image devices such as image converters and intensifiers, and particularly to the input screens of such devices.

The input screens of X-ray image tubes receive and convert a conical beam of radiation to a beam of electrons which is accelerated to, and focused upon, a fluorescent viewing screen. For practical purposes the X-rays may be considered to emanate from a point source within an X-ray generator. Hence, for all regions of the input screen to be equidistant from this point source the screen must have a spherical contour with the radiation incident side of the screen being concave. In actuality, however, the radiation incident side of input screens of modern day X-ray image tubes are convex rather than concave. As a result, the central region of today's input screens is located closer to the source of radiation than the peripheral region. Thus, X-rays impinging on the peripheral region have traveled further than those which strike the central region of the input screen. Where this travel has occurred through an X-ray filtering medium such as air, those X-rays which strike the peripheral region have also been filtered more than those striking the central region. This differential in travel also results in that portion of the beam striking the peripheral region being less intense than that striking the central region due to beam divergence, which intensity differential follows an inverse square law. Furthermore, where an object to be examined having generally uniform thickness is placed across the X-ray beam normal to the beam axis, X-rays at the periphery of the beam traverse a longer path through the object than do those at the beam's center. As a result, more X-rays are absorbed by the body at the peripheral region of the beam than at the central region whenever the atomic makeup, mass and density of both body regions is approximately the same. These phenomena result in less X-ray excitation of the peripheral region of the input screen than of the central region where the X-ray image of a body under observation should be uniform. This deviation in X-ray excitation will be transposed to a center-to-periphery dropoff in brightness on the fluorescent tube output screen. This may in turn lead to misinterpretation by an observer of information conveyed by the image tube regarding the composition of the object under investigation.

The just-described problem also presents itself in image intensifiers such as low level light amplifying tubes. Here, however, the problem is primarily occasioned by the need for a focusing lens or lens system to be placed in front of the input screen. The presence of the lens creates vignetting the effect of which is seen by a dropoff in center-to-periphery brightness on the tube output screen. Furthermore, a lens or lens system may be used in conjunction with the tube output in special cases which, of course, aggravates the vignetting effect.

Heretofore the problem of center-to-periphery dropoff has been alleviated in image tubes having a radiation transparent window forming a portion of the tube envelope through which incident radiation passes prior to striking the tube input screen. An X-ray image tube having such alleviation is disclosed in U.S. Pat. No. 2,955,219 in which the thickness of the window varies inversely with the distance measured radially from the window axis. This structure provides equal window thickness through which divergent X-rays pass, having been emitted from a source disposed along the window axis. This approach to the problem, however, is essentially negative since the window serves as a filter to some degree, especially where the incident radiation is of relatively long wavelength. Increasing the thickness of portions of the window thus results in an increase in filtration in that portion. Furthermore, this approach has been found to result in a degradation in the quality of the image. Specifically such structures have been found to produce an increase in X-ray scattering within the tube envelope with attendant sacrifice in image definition. This reduces the information made available Accordingly, it is a general object of the present invention to provide improved image devices such as image converters and intensifiers and, particularly, to provide an improved input screen for such devices.

More specifically, it is an object of the invention to provide an input screen for an image device having means compensating for vignetting induced by one or more extrinsic lenses or systems of lenses.

Yet another object of the invention is to provide an input screen for an image device adapted to convert or intensify an input image produced by an incident conical beam of high energy rays, such as X-rays, the input screen having means compensating for center-to-periphery beam dropoff in radiation intensity caused by variation in distance traveled by the rays from source to screen.

SUMMARY OF THE INVENTION

Briefly described, the present invention is an image device having an input screen to receive and convert radiant images to electron images. The input screen has central and peripheral regions with the peripheral region having greater conversion efficiency than the central region.

DESCRIPTION OF THE PREFERRED EMBODIMENTS

Figure 1:
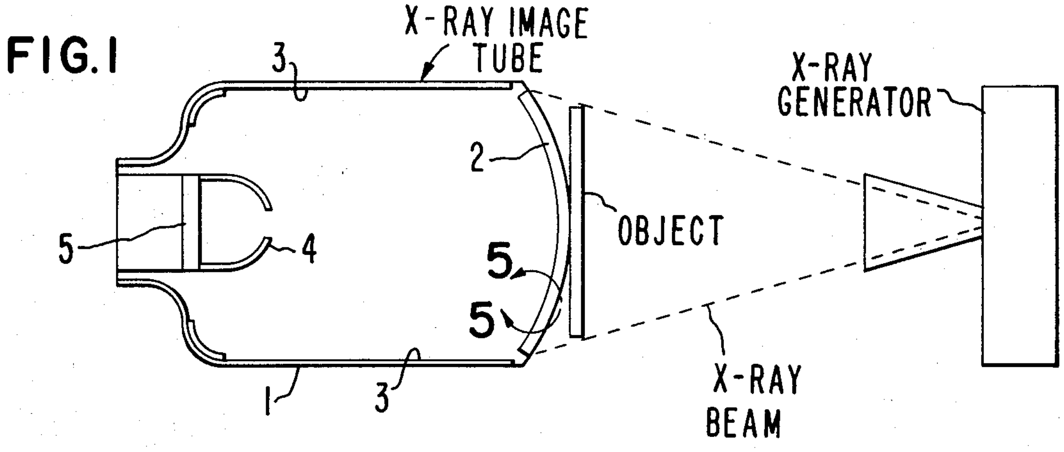
FIG. 1 is a schematic diagram of an X-ray system including an X-ray image tube of the present invention.

Referring now in more detail to the drawings, there is illustrated in FIG. 1 an X-ray system including an X-ray generator which projects a conical beam of X-rays against an object. An X-ray image tube is positioned behind the object to receive the X-ray image thereof. Such a system is described in detail in the article titled "X-Ray Image Intensification With A Large Diameter Image Intensifier Tube" appearing in the American Journal of Roentgenology Radium Therapy and Nuclear Medicine, Volume 85, pages 323–341 of Febuary 1961.

The X-ray image tube comprises a dielectric, evacuated envelope 1 which is approximately 17 inches long and 10 inches in diameter. The face portion of the tube includes a novel input screen 2 which is shown in greater detail in FIG. 5. The tube further comprises electron focusing electrode 3, and anode 4, and a fluorescent viewing screen 5.

Figure 5:
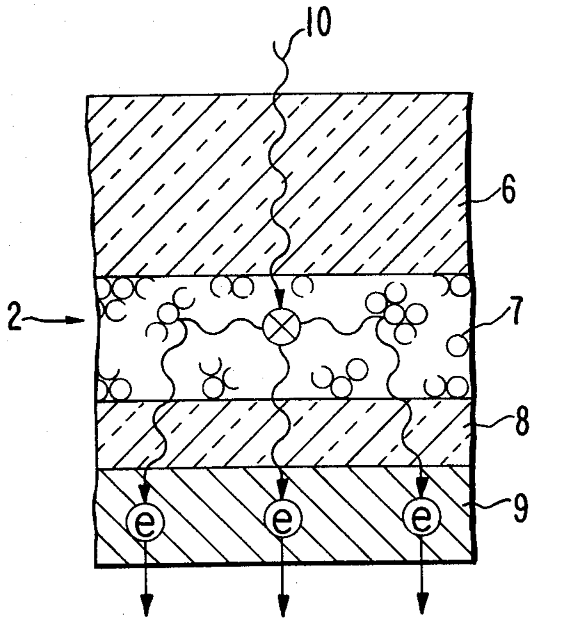
FIG. 5 is a greatly enlarged cross-sectional view of a small portion of the input screen of the X-ray image tube shown in FIG. 1 delineated by the line 5—5.

The input screen is shown in FIG. 5 to consist of a tube envelope member and input screen support layer 6 made of aluminum which is transparent to incident X-rays. A scintillator comprising a layer 7 of cesium iodide is deposited on the surface of support layer 6. A layer 8 of glass is next deposited onto the scintillator to provide a semi-transparent filter layer. Finally, a photocathode comprising a layer 9 of cesium antimonide is deposited onto the glass layer.

In operation, X-rays generated by the X-ray generator penetrate the object to be observed. The local X-ray attenuation depends on both the thickness and atomic number of elements forming the object under observation. Thus, the intensity pattern in the X-ray beam after penetration of the object contains information concerning the structure of the object. The X-ray image then passes through support layer 6 of the tube input screen and impinges upon scintillator 7 as symbolically shown by arrow 10 in FIG. 5. Within scintillator 7 the X-ray photons are absorbed and re-emitted as optical photons. The optical photons pass through filter layer 8 and strike photocathode 9 wherein they produce electrons *e*. The electrons are emitted from the photocathode in a pattern corresponding to the initial incident X-ray image. The electrons are then accelerated to a high velocity within the X-ray image tube and focused through anode 4 onto fluorescent viewing screen 5 for viewing by the eye or other suitable optical pickup device.

Figure 2:
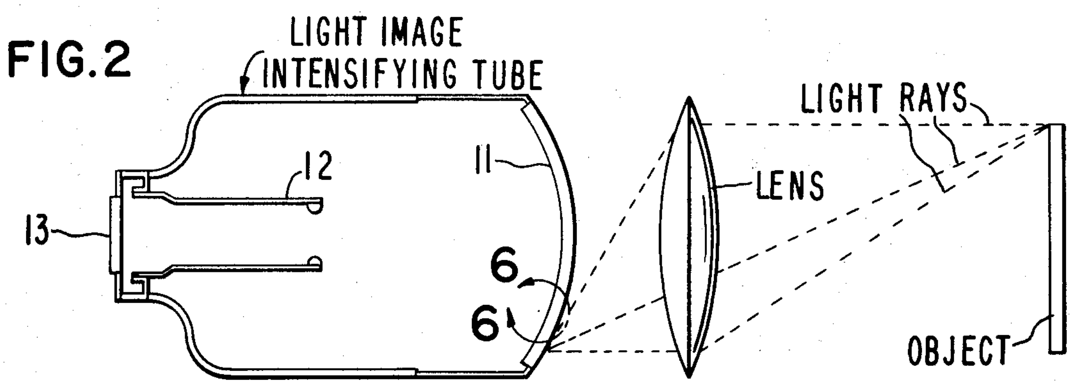
FIG. 2 is a schematic diagram of a light amplifying system including a light amplifying tube of the present invention.
Figure 6:
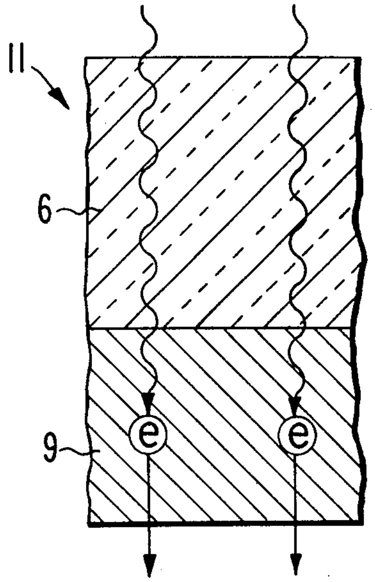
FIG. 6 is likewise a greatly enlarged cross-sectional view of a small portion of the input screen of the light amplifying tube shown in FIG. 3 delineated by the line 6—6.

FIG. 2 illustrates a light amplifying system wherein light rays from an object under observation are focused by a lens upon input screen 11 of an evacuated light amplifying tube. The input screen is shown in FIG. 6 to comprise a light transparent glass envelope face member 6 upon the inner surface of which is directly deposited a photocathode 9. In operation, optical photons pass through transparent envelope member 6 to strike photocathode 9 wherein they produce electrons e patterned after the optical image. The electrons are accelerated and focused through anode 12 onto fluorescent viewing screen 13. The light amplifying tube thus operates similarly to that of the described X-ray image tube, the principal distinction being the need for a scintillator or phosphor in the input screen of the latter to detect and convert incident X-rays to light. Image intensifiers are thus seen to amplify light reflected by poorly lit or poorly illuminated images while image converters such as X-ray image tubes detect an X-ray, ultraviolet, or infrared image and convert such invisible images to those which are visible.

Figure 3B:
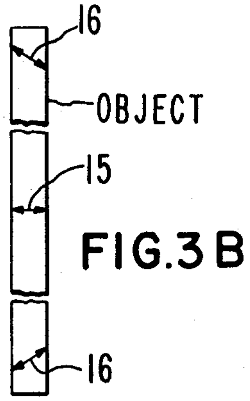
FIG. 3B is a profile view of a planar object disposed within the X-ray beam of FIG. 3A.
Figure 3A:
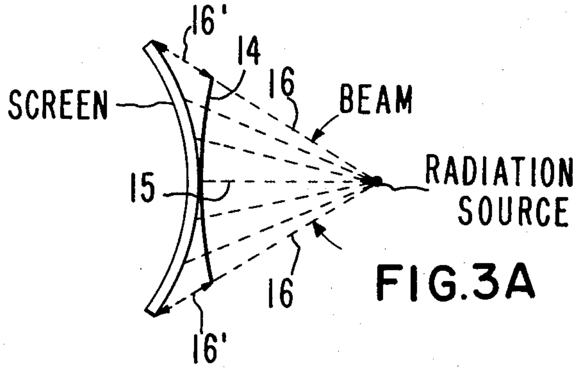
FIG. 3A presents a diagrammatical explanation for center-to-periphery dropoff in radiation intensity of a conical beam of radiation projected upon the convex surface of a spherical screen.

The cause discussed in the background of the invention for center-to-periphery dropoff in radiation intensity in a conical beam of high energy rays may be further appreciated by reference to FIG. 3A. Here all points along arc 14, which has been drawn tangentially to the convex surface of an input screen, are seen to lie equidistantly from a source of radiation. Thus ray 15 at the center of the beam has reached the screen while rays 16 at the edge of the beam have not after each has traveled the same distance from their common source.

The additional distance 16' which rays 16 must cover prior to impinging upon the screen will result in rays 16 having been subjected to more filtration than ray 15 whenever the medium through which the rays pass between their source and the screen functions as a filter for such radiation. In addition, rays adjacent to ray 15 will form a more dense portion of the beam than those adjacent rays 16 due to increased divergence with distance traveled. The same would hold true to a lesser degree even were the screen to be planar. As X-rays do not impinge perpendicular to the peripheral region of the screen, the brightness here is reduced by the cosine of the angle between the beam axis and the normal to the screen surface, although this is offset to some degree by the increased path which the X-rays follow through the screen. It may also be seen in FIG. 3B that ray 15, in passing through an object of approximately uniform thickness disposed within the conical beam normal to the beam axis, will follow a shorter path therethrough than rays 16 due to their variation in angles of incidence. This will cause greater absorption of rays 16 than ray 15 for like composition of object material traversed which will result in additional center-to-periphery dropoff in radiation intensity.

Figure 4:
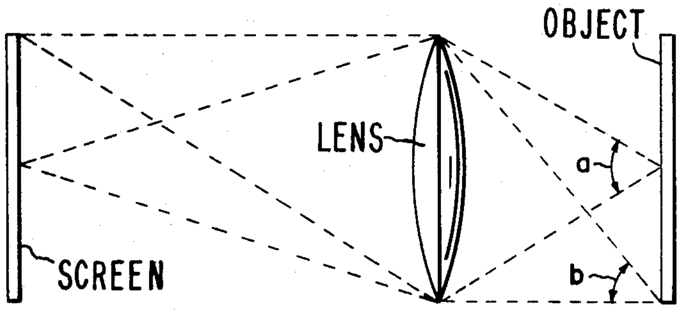
FIG. 4 presents a diagrammatical explanation of vignetting.

The previously discussed phenomenon of vignetting may be visualized by reference to FIG. 4. Here it is seen that light from a point at the center of an object which passes through a lens to be focused upon an adjacent screen subtends an angle *a* whereas light from a point at the bottom of the object which also passes through the lens subtends an angle *b*. As angle *a* is larger than angle *b*, less of the light from the bottom of the object will be focused on the screen than that from the center of the object. This results in a gradual dropoff in lumination from screen center to periphery.

Figure 7:
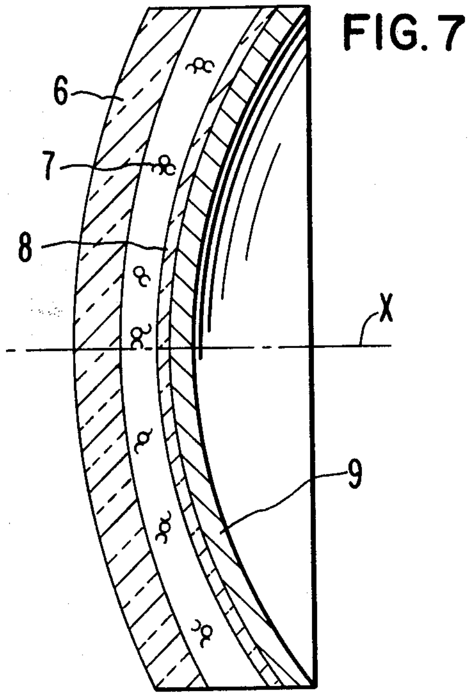
FIG. 7 is an enlarged cross-sectional view of a meniscus-shaped input screen for an X-ray image tube incorporating one feature of the present invention.

In accordance with the present invention, the peripheral region of image device input screens has greater conversion efficiency than the central region of such screens which is to say that the peripheral region emits a greater density of electrons in response to a given level of radiation excitation than does the central region. One embodiment of this is shown in FIG. 7 wherein scintillator 7 is in the shape of a negative meniscus, the thickness thereof gradually increasing from center to periphery. Due to this variation in scintillator thickness, radiation impinging upon the peripheral region of the scintillator will cause more optical photons to be emitted than would occur if radiation of corresponding intensity impinged upon the central region of the scintillator. The grade of thickness variation depends upon the variation in filtration encountered by various rays within the beam of radiation directed upon the input screen.

Figure 8:
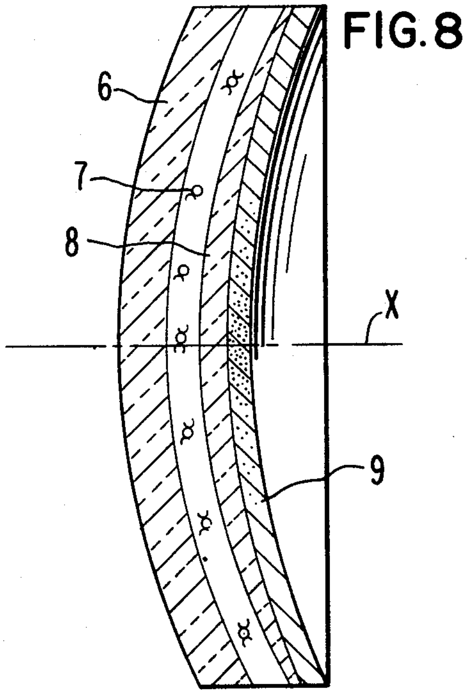
FIG. 8 is an enlarged cross-sectional view of a meniscus-shaped input screen for an X-ray image tube incorporating two other features of the present invention.

Another embodiment of the invention is illustrated in FIG. 8 wherein filter layer 8, disposed between scintillator 7 and photocathode 9, is of the shape of a converging meniscus. As the filter layer is translucent less light from the periphery of scintillator 7 will be filtered by filter layer 8 than light of equal intensity radiating from the center of the scintillator. This serves to compensate for the variation in beam filtration extrinsic to the image device.

Yet other embodiments of the invention occur in the composition of the photocathode, which embodiments may also be used in input screens having a phosphor or scintillator as well as in screens having no scintillator or filter layer such as that illustrated in FIG. 6. Note in the central region of photocathode 9 adjacent screen axis *x* the presence of small granules whose density gradually diminishes towards the photocathode periphery. These granules symbolize the presence of a photocathodic poison, that is, an agent which degrades the effectiveness of the photocathode in converting radiation images to electron images. As more poison is present in the central region than in the peripheral, photocathodic activity by photocathode 9 is more effective in the latter region. Alternatively, these granules may be considered to symbolize compositions productive of less than optimum photocathodic activity, optimum photocathodic composition being commonly determined empirically by reference to functional output during fabrication. With either consideration, however, the functional result is the same: greater photocathodic efficiency by the peripheral region of the photocathode than by the central region.

Obviously many modifications may be made in the described embodiments without departure from the spirit and scope of the invention; for example, the improved input screen could be used in a solid state image device as well as in an evacuated image tube. Also, features of the invention may be incorporated into a planar rather than a curved input screen. Furthermore, the described embodiments may be combined in several manners within a single input screen. Thus, the scope of the invention is to be construed by reference to the following claims

I claim:

1. In an image device having an input screen for receiving and converting radiant images to electron image, said input screen including a photocathode layer and having central and peripheral regions, the improvement comprising the composition of the peripheral region of said photocathode being productive of greater efficiency in converting light images to electron images than the composition of the central region of said photocathode, whereby said peripheral region of said screen has greater image conversion efficiency than said central region.

2. The apparatus of claim 1 wherein the central region has of said photocathode comprises a chemical agent detrimental to photocathodic activity.

3. In an image converter screen for converting an input image to an output image, one of said images being an electron image and the other of said images being a photon image, said screen having central and peripheral regions, the improvement comprising the composition of said peripheral region being productive of greater image conversion efficiency than the composition of said central region.

* * * * *